United States Patent
Mukaiyama

(10) Patent No.: US 12,116,037 B2
(45) Date of Patent: *Oct. 15, 2024

(54) PARKING SUPPORT APPARATUS

(71) Applicant: TOYOTA JIDOSHA KABUSHIKI KAISHA, Toyota (JP)

(72) Inventor: Yoshio Mukaiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

This patent is subject to a terminal disclaimer.

(21) Appl. No.: 18/077,776

(22) Filed: Dec. 8, 2022

(65) Prior Publication Data

US 2023/0103323 A1    Apr. 6, 2023

Related U.S. Application Data

(63) Continuation of application No. 17/092,522, filed on Nov. 9, 2020, now Pat. No. 11,548,551, which is a
(Continued)

(30) Foreign Application Priority Data

Nov. 29, 2016    (JP) .................................. 2016-230943

(51) Int. Cl.
B62D 15/02      (2006.01)
B60T 7/16       (2006.01)
G05D 1/00       (2024.01)

(52) U.S. Cl.
CPC ............ B62D 15/0285 (2013.01); B60T 7/16 (2013.01); G05D 1/0033 (2013.01); G05D 1/0227 (2013.01)

(58) Field of Classification Search
CPC .... B62D 15/0285; B60T 7/16; G05D 1/0033; G05D 1/0227
See application file for complete search history.

(56) References Cited

U.S. PATENT DOCUMENTS 9,842,447 B2 * 12/2017 Badger, II .......... G07C 9/00571
2007/0085656 A1 * 4/2007 Tang ...................... B60R 25/24
340/426.36
(Continued)

FOREIGN PATENT DOCUMENTS

DE    10 2012 200 725 A1    7/2013
DE       102012200625 A1    7/2013
(Continued)

OTHER PUBLICATIONS

Machine translation for DE102014015655A1, Burger Matthias, Apr. 2016.*
(Continued)

Primary Examiner — Abdalla A Khaled
(74) Attorney, Agent, or Firm — Sughrue Mion, PLLC

(57)  ABSTRACT

A parking support apparatus is provided with: a vehicle controller configured to park a vehicle by controlling behavior of the vehicle in accordance with the signal associated with the remote operation if a distance between a transmitter located outside of the vehicle and the vehicle is greater than or equal to a first distance and is less than or equal to a second distance. The vehicle controller performs a predetermined informing operation for an operator of the transmitter, instead of or in addition to controlling the behavior of the vehicle in accordance with the signal associated with the remote operation, if the distance is greater than or equal to the first distance and is less than or equal to a third distance or if the distance is greater than or equal to a fourth distance and is less than or equal to the second distance.

4 Claims, 3 Drawing Sheets

Related U.S. Application Data continuation of application No. 15/722,041, filed on Oct. 2, 2017, now Pat. No. 10,864,942.

(56) References Cited

U.S. PATENT DOCUMENTS

| | | | | |
|---|---|---|---|---|
| 2009/0096575 A1* | 4/2009 | Tieman | ............... | G07C 9/00309 340/5.62 |
| 2011/0257817 A1* | 10/2011 | Tieman | ................... | B60R 25/24 701/2 |
| 2016/0170494 A1* | 6/2016 | Bonnet | ................. | B60K 35/60 345/173 |
| 2017/0029028 A1* | 2/2017 | Kiyokawa | .............. | G08G 1/168 |
| 2018/0236957 A1* | 8/2018 | Nam | .................... | B62D 15/027 |

FOREIGN PATENT DOCUMENTS

| | | | |
|---|---|---|---|
| DE | 102014015655 A1 * | 4/2016 | |
| DE | 102015208624 A1 | 11/2016 | |
| EP | 1886905 A1 * | 2/2008 | |
| JP | 2005-178698 A | 7/2005 | |
| JP | 2006306233 A * | 11/2006 | |
| JP | 2013-121737 A | 6/2013 | |
| JP | 2016109487 A | 6/2016 | |
| WO | 2013/037694 A1 | 3/2013 | |

OTHER PUBLICATIONS

Machine transation for EP1886905A1, Brandtner Josef, Feb. 13, 2008.*

Machine translation for JP2006306233A, Hattori Toshihiro, Nov. 2006.*

* cited by examiner

PARKING SUPPORT APPARATUS

CROSS-REFERENCE TO RELATED APPLICATIONS

This application is a continuation of U.S. application Ser. No. 17/092,522, filed Nov. 9, 2020, which is a continuation of U.S. application Ser. No. 15/722,041, filed Oct. 2, 2017, now U.S. Pat. No. 10,864,942, issued Dec. 15, 2020, which is based upon and claims the benefit of priority of the prior Japanese Patent Application No. 2016-230943, filed on Nov. 29, 2016, the entire contents of each of which are incorporated herein by reference.

BACKGROUND OF THE INVENTION

1. Field of the Invention

Embodiments of the present invention relate to a parking support apparatus configured to perform parking support for parking a vehicle in a target position, and particularly relate to a parking support apparatus configured to operate a vehicle by remote control from a terminal located outside the vehicle.

2. Description of the Related Art

For this type of apparatus, for example, there is proposed an apparatus configured to adjust a parking position of a vehicle by using a remote operation apparatus operated outside the vehicle (refer to Japanese Patent Application Laid Open No. 2006-306233). This patent document discloses that a wireless communication area in which the remote operation apparatus and the vehicle can perform wireless communication is set within 10 meters from a body of the vehicle.

A user cannot recognize the wireless communication area, i.e. a range in which the vehicle can be operated by remote control. Thus, if a distance between the vehicle and the user is increased due to, e.g., movement of the vehicle, the vehicle may go out of the range in which the vehicle can be operated by remote control, without the user's intension. In this case, the vehicle possibly exhibits behavior that is different from the user's intension, but the user cannot accurately recognize the cause. This cannot be solved by the technique/technology disclosed in the aforementioned patent document.

SUMMARY

In view of the aforementioned problems, it is therefore an object of embodiments of the present invention to provide a parking support apparatus configured to enable a user to recognize a range in which a vehicle can be operated by remote control.

The above object of embodiments of the present invention can be achieved by a parking support apparatus is provided with: a receiver configured to receive a signal associated with remote operation transmitted by wireless communication to a vehicle from a transmitter located outside the vehicle; and a vehicle controller configured to park the vehicle by controlling behavior of the vehicle in accordance with the signal associated with the remote operation if a distance between the transmitter and the vehicle is greater than or equal to a first distance and is less than or equal to a second distance, which is greater than the first distance, wherein said vehicle controller performs a predetermined informing operation for an operator of the transmitter, instead of or in addition to controlling the behavior of the vehicle in accordance with the signal associated with the remote operation, (i) if the distance between the transmitter and the vehicle is greater than or equal to the first distance and is less than or equal to a third distance, which is greater than the first distance and is less than the second distance, or (ii) if the distance between the transmitter and the vehicle is greater than or equal to a fourth distance, which is greater than the third distance and is less than the second distance, and if the distance between the transmitter and the vehicle is less than or equal to the second distance.

In the parking support apparatus, the behavior of the vehicle is controlled by the vehicle controller in accordance with the signal associated with the remote operation if the distance between the transmitter and the vehicle is greater than or equal to the first distance and is less than or equal to the second distance. As a result, the vehicle is parked. Here, the "first distance" is set, for example, as a distance at which the vehicle moved by the remote operation is not in contact with the operator of the transmitter. On the other hand, the "second distance" is set, for example, as a maximum value of a distance at which the operator of the transmitter can visually recognize safety around the vehicle, or the like. The distance between the transmitter and the vehicle may be obtained on the basis of, e.g., signal intensity of the signal associated with the remote operation received by the vehicle, or the like.

In the parking support apparatus, the predetermined informing operation is performed by the vehicle controller for the operator of the transmitter, instead of or in addition to controlling the behavior of the vehicle in accordance with the signal associated with the remote operation, if the distance between the transmitter and the vehicle is greater than or equal to the first distance and is less than or equal to the third distance or if the distance between the transmitter and the vehicle is greater than or equal to the fourth distance and is less than or equal to the second distance. The operator of the transmitter recognizes a change in the vehicle caused by the predetermined informing operation, by which the operator can recognize a distance range in which the vehicle can be operated by remote control (i.e. a range in which the distance between the transmitter and the vehicle is greater than or equal to the first distance and is less than or equal to the second distance). According to the parking support apparatus, it is therefore possible to make the operator of the transmitter recognize the distance range in which the vehicle can be operated by remote control.

The informing operation performed instead of controlling the behavior of the vehicle in accordance with the signal associated with the remote operation may include, for example, decelerating the vehicle, or the like. The informing operation performed in addition to controlling the behavior of the vehicle in accordance with the signal associated with the remote operation may include, for example, blinking a hazard lamp, making an alarm sound, or the like.

Each of the "third distance" and the "fourth distance" may be appropriately set. If, however, there is a relatively large difference between the first distance and the third distance and/or a relative large difference between the fourth distance and the second distance, the operator may recognize the distance range in which the vehicle can be operated by remote control, to be narrower than an actual distance due to the implementation of the predetermined informing operation. It is therefore desirable to pay attention to this point to set each of the "third distance" and the "fourth distance".

In one aspect of the parking support apparatus according to embodiments of the present invention, said parking support apparatus comprises an obstacle detector configured to detect an obstacle around the vehicle, and said vehicle controller performs the predetermined informing operation for the operator, instead of or in addition to controlling the behavior of the vehicle in accordance with the signal associated with the remote operation, if the distance between the transmitter and the vehicle is greater than or equal to the first distance and is less than or equal to the third distance and if a position of the obstacle detected by said obstacle detector corresponds to a position of the transmitter.

If the vehicle is operated by remote control from the outside of the vehicle, the operator of the transmitter is highly likely detected as the obstacle around the vehicle. If the operator is detected as the obstacle and then, for example, the vehicle is stopped, attractiveness as products is reduced.

Thus, in the parking support apparatus, the predetermined informing operation is performed if the distance between the transmitter and the vehicle is greater than or equal to the first distance and is less than or equal to the third distance (i.e. if the operator of the transmitter is relatively close to the vehicle) and if the position of the obstacle detected by the obstacle detector corresponds to the position of the transmitter (i.e. if the operator is detected as the obstacle). In other words, if the obstacle is detected in a position relatively close to the vehicle, in theory, for example, the vehicle is stopped in order to avoid contact/collision between the vehicle and the obstacle; however, if the operator is detected as the obstacle, the predetermined informing operation is performed.

By virtue of such a configuration, it is possible to suppress the stop of the vehicle caused by the fact that the operator is detected as the obstacle. Here, the operator can predict the behavior of the vehicle, which is operated by remote control by himself or herself, and it is thus considered that the operator does not come into contact/collision with the vehicle even in the aforementioned configuration.

The expression "the position of the obstacle detected corresponds to the position of the transmitter" conceptually includes not only that the position of the obstacle detected matches the position of the transmitter, but also that the position of the obstacle detected and the position of the transmitter are shifted to an extent that the operator of the transmitter is practically considered to exist in the position of the obstacle detected The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A parking support apparatus according to an embodiment of the present invention will be explained with reference to FIG. 1 to FIG. 4. The embodiment below exemplifies a vehicle 1 equipped with a parking support apparatus according to one specific example of embodiments of the present invention.

(Configuration of Vehicle)

Figure 1:
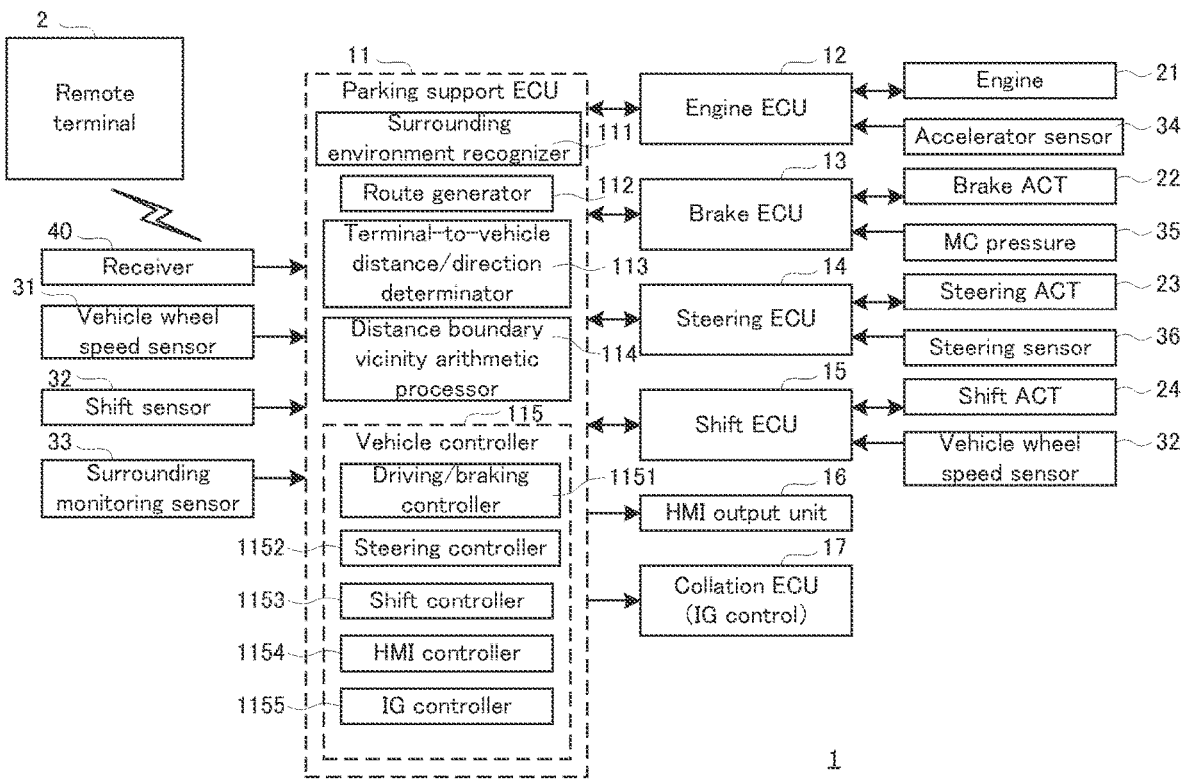
FIG. 1 is a block diagram illustrating a configuration of a vehicle according to an embodiment.

A configuration of the vehicle 1 according to the embodiment will be explained with reference to FIG. 1. FIG. 1 is a block diagram illustrating the configuration of the vehicle 1 according to the embodiment. For convenience of explanation, two shift sensors 32 are drawn in FIG. 1, but they are the same sensor.

In FIG. 1, the vehicle 1 is provided with a parking support electronic control unit (ECU) 11, an engine ECU 12, a brake ECU 13, a steering ECU 14, a shift ECU 15, a human machine interface (HMI) output unit 16, a collation ECU 17, an engine 21, a brake actuator (or brake ACT) 22, a steering actuator (or steering ACT) 23, a shift actuator (or shift ACT) 24, a vehicle wheel speed sensor 31, a shift sensor 32, a surrounding monitoring sensor 33, an accelerator sensor 34, a master cylinder pressure (MC pressure) sensor 35, a steering sensor 36, and a receiver 40.

The parking support ECU 11 is configured to receive via the receiver 40 a signal associated with remote operation transmitted from a remote terminal 2, which can be taken out from the vehicle by a user, such as a driver, and to control behavior of the vehicle 1, thereby performing parking support control, which is to park the vehicle 1. The "parking support ECU 11" and the "remote terminal 2" are respectively one example of the "vehicle controller" and the "transmitter" according to embodiments of the present invention.

In order to perform the parking support control, the parking support ECU 11 has a surrounding environment recognizer 111, a route generator 112, a terminal-to-vehicle distance/direction determinator 113 (hereinafter referred to as a "determinator 113" as occasion demands), a distance boundary vicinity arithmetic processor 114 (hereinafter referred to as an "arithmetic processor 114" as occasion demands), and a vehicle controller 115, as processing blocks logically realized therein or processing circuits physically realized therein.

The vehicle controller 115 has therein a driving/braking controller 1151, a steering controller 1152, a shift controller 1153, a HMI controller 1154, and ignition (IG) controller 1155.

The surrounding environment recognizer 111 is configured to detect a position of an obstacle around the vehicle 1, a white line indicating a parking space, or the like, from the output of the surrounding monitoring sensor 33, such as, for example, a camera, a sound wave sensor, a laser radar, an infrared sensor, and a global positioning system (GPS). The existing various aspects can be applied to a method of detecting the obstacle or the like, and an explanation of the details will be thus omitted.

The route generator 112 is configured to generate a driving route from a current position of the vehicle 1 to a position in which the vehicle 1 is to be parked, on the basis of the output of the surrounding environment recognizer 111. The existing various aspects can be applied to a method of generating the driving route, and an explanation of the details will be thus omitted.

The determinator 113 is configured to receive a signal from the remote terminal 2 and to specify a distance between the remote terminal 2 and the vehicle 1 and a direction of the remote terminal 2 viewed from the vehicle 1 on the basis of, e.g., intensity of the received signal or the like. The existing various aspects can be applied to a method of specifying the distance between the remote terminal 2 and the vehicle 1 and the direction of the remote terminal 2 viewed from the vehicle 1, and an explanation of the details will be thus omitted.

The driving/braking controller 1151 is configured to respectively control the engine 21 and the brake ACT 22 in cooperation with the engine ECU 12 and the brake ECU 13 in performing the parking support control. The steering controller 1152 is configured to control the steering ACT 23 in cooperation with the steering ECU 14 in performing the parking support control. The shift controller 1153 is configured to control the shift ACT 24 in cooperation with the shift ECU 15 in performing the parking support control. The HMI controller 1154 is configured to control the HMI controller 16, which is, for example, a display, a speaker, or the like, in performing the parking support control.

The IG controller 1155 is configured to authenticate the remote terminal 2. If the authentication of the remote terminal 2 is succeeded, the IG controller 1155 is configured to output a signal indicating ignition-on or ignition-off to the collation ECU 17 in accordance with the signal associated with the remote operation from the remote terminal 2. The existing various aspects can be applied to the authentication of the remote terminal 2, and an explanation of the details will be thus omitted.

(Parking Support Control)

The parking support control according to the embodiments has two modes, i.e. a mode in which the vehicle 1 travels along the driving route generated by the route generator 112 and a mode in which the vehicle 1 goes straight forward or goes straight backward.

In the mode in which the vehicle 1 travels along the driving route, the vehicle 1 automatically travels along the driving route only when a not-illustrated control button of the remote terminal 2 is ON. This mode is used mainly when the vehicle 1 enters a predetermined parking space and when the vehicle 1 leaves the parking space. In the mode in which the vehicle 1 goes straight forward or goes straight backward, the vehicle 1 goes straight forward or goes straight backward only when the control button of the remote terminal 2 is ON. This mode is used mainly when a parking position of the vehicle 1 is adjusted. The existing various aspects can be applied to the modes, and an explanation of the details will be thus omitted.

Here, for example, from the viewpoint of ensuring safety in performing the parking support control or the like, a range in which the parking support control can be performed is set in advance. Specifically, only when the remote terminal 2 (i.e. the user who operates the remote terminal 2) is located in a range of an area B, the parking support control is performed on the basis of the signal associated with the remote operation from the remote terminal 2.

Figure 2:
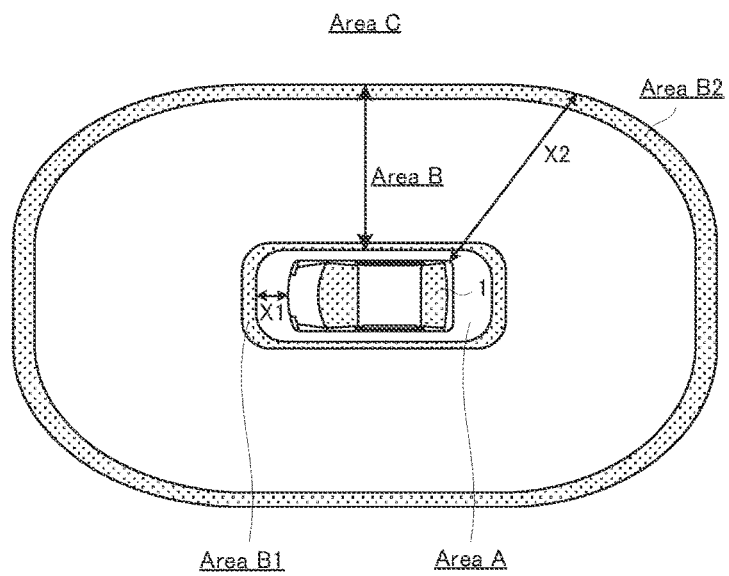
FIG. 2 is a diagram illustrating one example of an area in which parking support control according to the embodiment can be performed.

In FIG. 2, an area A is an area with a distance X1 from a side of the vehicle 1, wherein the "side" conceptually includes a front surface and a rear surface. The area B is an area with a distance X1 to X2 from the side of the vehicle 1. An area C is an area with a distance greater than the distance X2 from the side of the vehicle 1.

In FIG. 2, each of the distance X1 and the distance X2 varies between in a longitudinal direction of the vehicle and in a lateral direction of the vehicle. This is because the distance X1 and the distance X2 are set considering that a moving distance in the longitudinal direction of the vehicle 1 is greater than a moving distance in the lateral direction of the vehicle 1. Each of the distance X1 and the distance X2 may be set at a unique value in all directions.

The "distance X1" as one example of the "first distance" according to embodiments of the present invention may be set, for example, as a distance at which the moving vehicle 1 is not in contact with the user who operates the remote terminal 2, in performing the parking support control. Specifically, for example, the distance X1 in the longitudinal direction of the vehicle 1 may be set as a value that is greater by a predetermined value than a stop distance associated with a moving speed of the vehicle 1 in performing the parking support control. Alternatively, the "distance X1" may be set as a distance at which an operation for avoiding collision with the obstacle detected by the surrounding environment recognizer 111 (or typically, braking) is performed.

The "distance X2" as one example of the "second distance" according to embodiments of the present invention may be set, for example, as a maximum value of a distance at which the user who operates the remote terminal 2 can visually recognize safety around the vehicle 1, or the like. The distance X2 may be changed depending on, e.g., the number of obstacles that exist around the vehicle 1. The distance X2 is less than a maximum distance in which the remote terminal 2 and the vehicle 1 (or the receiver 40) can perform wireless communication.

The arithmetic processor 114 (refer to FIG. 1) is configured to set an area B1 in the vicinity of an inner boundary of the area B (i.e. a boundary between the area B and the area A) and to set an area B2 in the vicinity of an outer boundary of the area B (i.e. a boundary between the B and the area C).

Here, the user cannot visually recognize the area B. Thus, for example, if the remote terminal 2 moves from the area B to the area C due to the movement of the vehicle 1 or the movement of the user and the parking support control is then stopped and the vehicle 1 is stopped, the user hardly recognizes the reason of the stop of the vehicle 1.

The arithmetic processor 114 is thus configured to perform an informing operation for informing the user of being close to the boundary of the area B if the remote terminal 2 is located in the area B1 or the area B2. The "informing operation" according to the embodiment not only includes an operation of giving some information to the user by using audio and images, but also conceptually includes an operation that enables the user to notice a change in the vehicle 1, such as, for example, a speed reduction of the vehicle 1.

The informing operation, however, is partially different from an operation performed due to the movement of the remote terminal 2 from the area B to the area A or C (which is, in this case, an operation of stopping the vehicle 1). The reason is as below. The informing operation is intended to inform the user of the fact that the remote terminal 2 is still located in the area B but is particularly located in the area B1 or B2 with a relatively high possibility that the remote terminal 2 moves to the area A or C from the area B. If the operation performed when the remote terminal 2 moves to the area A or C from the area B is the same as the operation performed when the remote terminal 2 is located in the area B1 or B2, the user cannot recognize whether the remote terminal 2 is still located in the area B or is located in the area A or C.

Specifically, for example, the arithmetic processor 114 is configured to decelerate the vehicle 1 by reducing an upper limit value of a control vehicle speed associated with the parking support control (refer to FIG. 3) or to blink a hazard lamp when the remote terminal 2 is located in the area B1 or the area B2.

Figure 3:
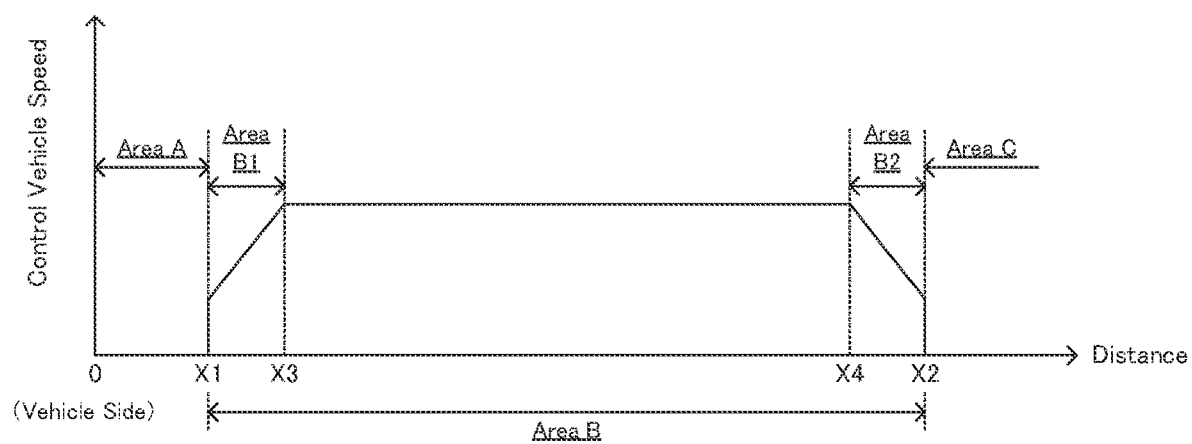
FIG. 3 is a diagram illustrating one example of a change in control vehicle speed with respect to distance according to the parking support control in the embodiment.

In FIG. 3, a "distance X3" is one example of the "third distance" according to embodiments of the present invention, and is a value for defining the width of the area B1. A "distance X4" is one example of the "fourth distance" according to embodiments of the present invention, and is a value for defining the width of the area B2. Each of the "distance X3" and the "distance X4" may be appropriately set. If, however, the width of the area B1 or the width of the area B2 is relatively large, the user possibly recognizes the area B to be narrower than an actual width due to the implementation of the informing operation. Thus, each of the "distance X3" and the "distance X4" is desirably set at a value in which a period from entrance into the area B1 or the area B2 to exit from the area B1 or the area B2 caused by the movement of the vehicle 1 is slightly longer than a period from the start of the informing operation to the user's recognition of the informing operation, for example, if the vehicle 1 moves while the user who operates the remote terminal 2 is standing.

Next, the informing operation according to the embodiment will be explained with reference to a flowchart in FIG. 4.

Figure 4:
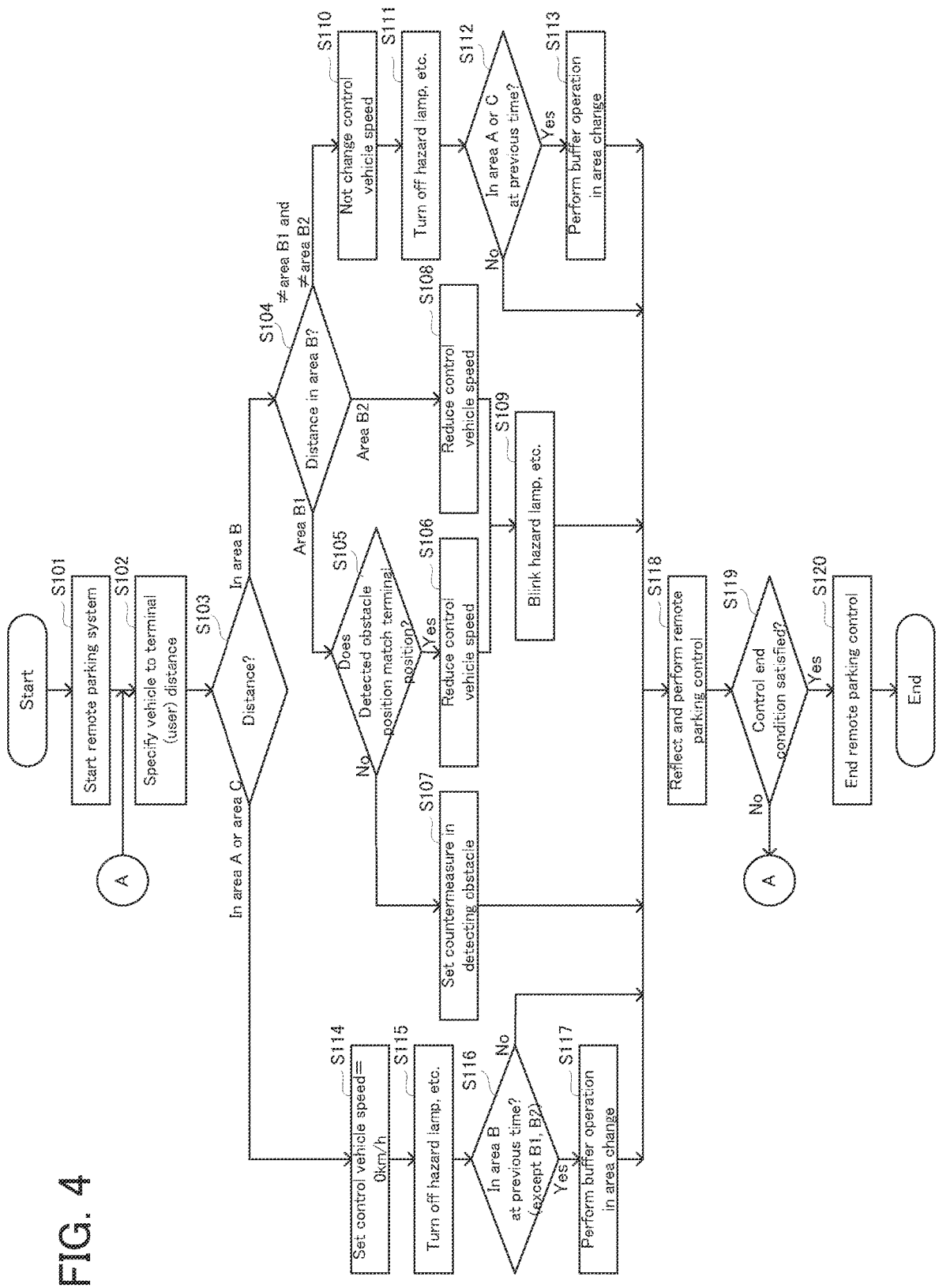
FIG. 4 is a flowchart illustrating an informing operation according to the embodiment.

In FIG. 4, after an application associated with the parking support control is started due to the operation of the remote terminal 2 (step S101), the determinator 113 of the parking support ECU 11 receives, e.g., the signal from the remote terminal 2, and specify the distance between the remote terminal 2 and the vehicle 1 on the basis of the intensity of the received signal or the like (step S102). At this time, the determinator 113 also specifies the direction of the remote terminal 2 viewed from the vehicle 1.

Next, the arithmetic processor 114 determines in which of the area A, the area B, and the area C the remote terminal 2 is located, on the basis of the specified distance between the remote terminal 2 and the vehicle 1 (step S103). In this determination, if it is determined that the remote terminal 2 is located in the area B (the step S103: In area B), the arithmetic processor 114 determines in which area of the area B the remote terminal 2 is located, on the basis of the specified distance between the remote terminal 2 and the vehicle 1 (step S104).

In the determination in the step S104, if it is determined that the remote terminal 2 is located in the area B1 (the step S104: area B1), the arithmetic processor 114 determines whether or not the position of the obstacle detected by the surrounding environment recognizer 111 matches the position of the remote terminal 2, which is based on the distance between the remote terminal 2 and the vehicle 1 specified by the determinator 113 and which is based on the direction of the remote terminal 2 viewed from the vehicle 1 (step S105).

Here, the expression "the position of the obstacle matches the position of the remote terminal 2" conceptually includes not only that the position of the obstacle perfectly matches the position of the remote terminal 2, but also that the position of the obstacle and the position of the remote terminal 2 are shifted to an extent that the remote terminal 2 is practically considered to exist in the position of the obstacle detected by the surrounding environment recognizer 111.

In the determination in the step S105, if it is determined that the position of the obstacle matches the position of the remote terminal 2 (the step S105: Yes), the arithmetic processor 114 transmits signals indicating that the upper limit value of the control vehicle speed associated with the parking support control is reduced (step S106) and that the hazard lamp etc. is blinked (step S109), to the vehicle controller 115. In the step S106, as illustrated in FIG. 3, as the remote terminal 2 and the vehicle 1 approach each other, the upper limit value of the control vehicle speed becomes lower. As a result, the vehicle controller 115 decelerates the vehicle 1 and blinks the hazard lamp etc (step S118).

If it is determined that the position of the obstacle matches the position of the remote terminal 2, the obstacle is the user who operates the remote terminal 2. The user operates the vehicle 1 by remote control, and the user can thus easily avoid contact or collision with the vehicle 1 by predicting the movement of the vehicle 1 or by stopping the vehicle 1. Thus, in the step S106, the vehicle 1 is not stopped even though the upper limit value of the control vehicle speed associated with the parking support control is reduced. By virtue of such a configuration, for example, it is possible to prevent that the vehicle 1 is stopped without the user's intention every time the user approaches the vehicle 1 to confirm the parking position.

In the step S109, instead of or in addition to blinking the hazard lamp, the following may be adopted: for example, momentarily flashing a headlight upward (so-called high beam), sounding a horn, changing a volume and a tone of an attention-drawing sound, such as a pseudo-engine sound, when the vehicle 1 is a hybrid vehicle and travels only with a driving motor in performing the parking support control or when the vehicle 1 is an electric vehicle, vibrating the remote terminal 2, changing screen display or blinking a screen of the remote terminal 2, and the like.

After the step S118, the parking support ECU 11 determines whether or not a control end condition is satisfied (step S119). Here, the "control end condition" includes, for example, receiving a signal indicating the end of the control from the remote terminal 2, not receiving any signal from the remote terminal 2 for a predetermined time after a change from ON to OFF of the control button, or the like.

In the determination in the step S119, if it is determined that the control end condition is not satisfied (the step S119: No), the process after the step S102 is performed again. On the other hand, if it is determined that the control end condition is satisfied (the step S119: Yes), the parking support ECU 11 ends the parking support control (step S120).

In the determination in the step S105, if it is determined that the position of the obstacle does not match the position of the remote terminal 2 (the step S105: No), the arithmetic processor 114 transmits a signal indicating a countermeasure in detecting the obstacle (or typically a signal indicating the stop of the vehicle 1) to the vehicle controller 115 (step S107). As a result, the vehicle controller 115 controls the vehicle 1 in accordance with the signal indicating the countermeasure in detecting the obstacle (step S118).

In the determination in the step S104, if it is determined that the remote terminal 2 is located in the area B2 (the step S104: area B2), the arithmetic processor 114 transmits signals indicating that the upper limit value of the control vehicle speed associated with the parking support control is reduced (step S108) and that the hazard lamp etc. is blinked (the step S109), to the vehicle controller 115. In the step S108, as illustrated in FIG. 3, as the remote terminal 2 is separated further from the vehicle 1, the upper limit value of the control vehicle speed becomes lower. As a result, the vehicle controller 115 decelerates the vehicle 1 and blinks the hazard lamp etc (the step S118).

In the determination in the step S104, if it is determined that the remote terminal 2 is located in a part of the area B other than the area B1 and the area B2 (the step S104: ≠area B1 and ≠area B2), the arithmetic processor 114 maintains the upper limit value of the control vehicle speed associated with the parking support control or returns the upper limit value to an initial value if the upper limit value is changed in the step S106 or S108 (step S110), and turns off the hazard lamp or performs similar actions if the blinking of the hazard lamp etc. is performed in the step S109 (step S111).

Then, the arithmetic processor 114 determines whether or not the remote terminal 2 was in the area A or the area C at a previous time (step S112). In this determination, if it is determined that the remote terminal 2 was not in the area A or the area C at the previous time (the step S112: No), the arithmetic processor 114 transmits signals indicating that the upper limit value of the control vehicle speed associated with the parking support control is maintained and that the hazard lamp etc. is turned off, to the vehicle controller 115. As a result, the vehicle controller 115 controls the vehicle 1 in accordance with the transmitted signals.

On the other hand, in the determination in the step S112, if it is determined that the remote terminal 2 was in the area A or the area C at the previous time (the step S112: Yes), the arithmetic processor 114 transmits a signal indicating a buffer operation in area change, to the vehicle controller 115, in addition to the signals indicating that the upper limit value of the control vehicle speed associated with the parking support control is maintained and that the hazard lamp etc. is turned off (step S113). As a result, the vehicle controller 115 controls the vehicle 1 in accordance with the transmitted signals.

As illustrated in FIG. 3, the control vehicle speed in the area A or the area C is "0"; namely, the vehicle 1 is stopped. On the other hand, the control vehicle speed in the part of the area B other than the area B1 and the area B2 is, for example, a low speed. For example, if the user relatively quickly moves from the area A to the part of the area B other than the area B1 and the area B2, it may not be determined that the remote terminal 2 is in the area B1. In this case, if the speed of the vehicle 1 is suddenly increased, the behavior of the vehicle 1 possibly becomes unnatural. Therefore, in the embodiment, the buffer operation in the area change, such as, for example, vehicle speed averaging, is performed.

Back in FIG. 4, in the determination in the step S103, if it is determined that the remote terminal 2 is located in the area A or the area C (the step S103: In area A or area C), the arithmetic processor 114 sets the control vehicle speed associated with the parking support control to 0 km/h (step S114), and turns off the hazard lamp etc. if the blinking of the hazard lamp etc. is performed in the step S109 (step S115).

Then, the arithmetic processor 114 determines whether or not the remote terminal 2 was in the part of the area B other than the area B1 and the area B2 at a previous time (step S116). In this determination, if it is determined that the remote terminal 2 was not in the part of the area B other than the area B1 and the area B2 at the previous time (the step S116: No), the arithmetic processor 114 transmits signals indicating that the control vehicle speed associated with the parking support control is set to 0 km/h and that the hazard lamp etc. is turned off, to the vehicle controller 115. As a result, the vehicle controller 115 controls the vehicle 1 in accordance with the transmitted signals.

On the other hand, in the determination in the step S116, if it is determined that the remote terminal 2 was in the part of the area B other than the area B1 and the area B2 at the previous time (the step S116: Yes), the arithmetic processor 114 transmits the signal indicating the buffer operation in area change, to the vehicle controller 115, in addition to the signals indicating that the control vehicle speed associated with the parking support control is set to 0 km/h and that the hazard lamp etc. is turned off (step S117). As a result, the vehicle controller 115 controls the vehicle 1 in accordance with the transmitted signals.

Technical Effect

In the embodiment, if the remote terminal 2 is in the area B1 or the area B2, i.e. if the user who operates the remote terminal 2 is in the vicinity of the boundary of the area B in which the parking support control can be performed, the informing operation such as, for example, decelerating the vehicle 1 and blinking the hazard lamp is performed. The user is notified of a change in the vehicle 1 caused by the informing operation, by which it is possible to make the user recognize the range of the area B. As a result, if the user takes an action of staying in the area B, it is possible to prevent that the vehicle 1 is stopped without the user's intention due to the fact that the user leaves the area B.

In the embodiment, if it is determined that the position of the obstacle detected by the surrounding environment recognizer 111 matches the position of the remote terminal 2, the upper limit value of the control vehicle speed associated with the parking support control is reduced, but the vehicle 1 is not stopped. It is thus possible to prevent that the vehicle 1 is stopped without the user's intention every time the user approaches the vehicle 1, for example, to confirm the parking position.

Modified Example

If the upper limit value of the control vehicle speed associated with the parking support control is set low to perform fine adjustment of the parking position of the vehicle 1, there is almost no room for deceleration when the remote terminal 2 is in the area B1 or the area B2. Even if the vehicle 1 is decelerated, the user who operates the remote terminal 2 highly likely does not notice the deceleration of the vehicle 1. In this case, the steps S106 and S108 may not be performed.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:
1. A parking support apparatus comprising:
a receiver configured to receive a signal associated with a remote operation transmitted wirelessly to a vehicle from a transmitter located outside the vehicle; and
a vehicle controller configured to control a behavior of the vehicle, wherein
said vehicle controller being configured not to perform a parking support control for parking the vehicle by controlling the behavior of the vehicle in accordance with the signal associated with the remote operation when the transmitter is closer to the vehicle than a first distance,
said vehicle controller being configured not to perform the parking support control when the transmitter is farther from the vehicle than a second distance, which is greater than the first distance, said vehicle controller being configured to reduce an upper limit of a velocity of the vehicle when a distance between the transmitter and the vehicle becomes closer to the first distance during performing of the parking support control in a situation, in which the transmitter is further from the vehicle than the first distance and the transmitter is closer to the vehicle than a third distance, wherein the third distance is greater than the first distance and is less than the second distance, and said vehicle controller being configured to reduce the upper limit when the distance between the transmitter and the vehicle becomes closer to the second distance during performing of the parking support control in a situation, in which the transmitter is further from the vehicle than a fourth distance and the transmitter is closer to the vehicle than the second distance, wherein the fourth distance is greater than the third distance and is less than the second distance.

2. A parking support apparatus comprising:

a receiver configured to receive a signal associated with a remote operation transmitted wirelessly to a vehicle from a transmitter located outside the vehicle; and a vehicle controller configured to control a behavior of the vehicle, wherein said vehicle controller being configured not to perform a parking support control for parking the vehicle by controlling the behavior of the vehicle in accordance with the signal associated with the remote operation when the transmitter is closer to the vehicle than a first distance, said vehicle controller being configured not to perform the parking support control when the transmitter is farther from the vehicle than a second distance, which is greater than the first distance, said vehicle controller being configured to stop the performance of the parking support control, thereby causing the vehicle to stop, when the transmitter is farther from the vehicle than the second distance, by moving the transmitter during performing of the parking support control in a situation, in which the transmitter is further from the vehicle than the first distance and the transmitter is closer to the vehicle than the second distance, said vehicle controller being configured to reduce an upper limit of a velocity of the vehicle when a distance between the transmitter and the vehicle becomes closer to the first distance during performing of the parking support control in a situation, in which the transmitter is further from the vehicle than the first distance and the transmitter is closer to the vehicle than a third distance, wherein the third distance is greater than the first distance and is less than the second distance, and said vehicle controller being configured to reduce the upper limit when the distance between the transmitter and the vehicle becomes closer to the second distance during performing of the parking support control in a situation, in which the transmitter is further from the vehicle than a fourth distance and the transmitter is closer to the vehicle than the second distance, wherein the fourth distance is greater than the third distance and is less than the second distance.

3. The parking support apparatus according to claim 1, wherein said vehicle controller is configured to reduce an upper limit of a velocity of the vehicle when a distance between the transmitter and the vehicle becomes closer to the first distance during performing of the parking support control in a situation, in which the transmitter is further from the vehicle than the first distance and the transmitter is closer to the vehicle than the second distance, and said vehicle controller is configured to reduce the upper limit as the distance becomes closer to the second distance during performing of the parking support control in the situation, in which the transmitter is further from the vehicle than the first distance and the transmitter is closer to the vehicle than the second distance.

4. The parking support apparatus according to claim 2, wherein said vehicle controller is configured to reduce an upper limit of a velocity of the vehicle when a distance between the transmitter and the vehicle becomes closer to the first distance during performing of the parking support control in a situation, in which the transmitter is further from the vehicle than the first distance and the transmitter is closer to the vehicle than the second distance, and said vehicle controller is configured to reduce the upper limit as the distance becomes closer to the second distance during performing of the parking support control in the situation, in which the transmitter is further from the vehicle than the first distance and the transmitter is closer to the vehicle than the second distance.

* * * * *